(12) United States Patent
Cullen et al.

(10) Patent No.: US 8,487,500 B2
(45) Date of Patent: Jul. 16, 2013

(54) COOLING ARRANGEMENT OF AN ELECTRICAL MACHINE

(75) Inventors: John James Anthony Cullen, Derby (GB); David James Powell, Sheffield (GB)

(73) Assignee: Rolls-Royce PLC, London (GB)

( * ) Notice: Subject to any disclaimer, the term of this patent is extended or adjusted under 35 U.S.C. 154(b) by 294 days.

(21) Appl. No.: 12/010,272

(22) Filed: Jan. 23, 2008

(65) Prior Publication Data

US 2008/0197724 A1 Aug. 21, 2008

(30) Foreign Application Priority Data

Feb. 16, 2007 (GB) .................................. 0702997.8

(51) Int. Cl.
*H02K 9/04* (2006.01)

(52) U.S. Cl.
USPC ...... 310/215; 310/216.119; 310/58; 310/216.081

(58) Field of Classification Search
USPC .................. 310/215, 216.081, 82, 119, 125, 310/192, 254.1, 214, 216.069, 216.071, 216.072, 216.073, 44, 58
See application file for complete search history.

(56) References Cited

U.S. PATENT DOCUMENTS

| | | | | |
|---|---|---|---|---|
| 1,448,700 A | * | 3/1923 | Seidner | 310/54 |
| 2,716,196 A | * | 8/1955 | Anderson et al. | 310/68 D |
| 3,504,207 A | * | 3/1970 | Tjernstrom | 310/54 |
| 4,152,610 A | * | 5/1979 | Wallenstein | 310/59 |
| 4,217,511 A | * | 8/1980 | King et al. | 310/55 |
| 4,473,765 A | * | 9/1984 | Butman et al. | 310/215 |
| 5,744,889 A | * | 4/1998 | Niimi | 310/239 |
| 5,886,443 A | * | 3/1999 | Dymond et al. | 310/196 |
| 5,952,761 A | * | 9/1999 | Itoh et al. | 310/215 |
| 6,191,510 B1 | * | 2/2001 | Landin et al. | 310/51 |
| 6,225,723 B1 | * | 5/2001 | Cooper et al. | 310/214 |
| 6,288,460 B1 | * | 9/2001 | Fakult et al. | 310/52 |
| 6,339,269 B1 | | 1/2002 | Hsiao | |
| 6,499,209 B1 | * | 12/2002 | Landin et al. | 29/596 |
| 6,583,532 B2 | * | 6/2003 | Hein et al. | 310/260 |
| 6,756,710 B2 | * | 6/2004 | Bourqui et al. | 310/44 |
| 6,809,441 B2 | * | 10/2004 | Randall | 310/54 |

(Continued)

FOREIGN PATENT DOCUMENTS

| BE | 1015432 A3 | 3/2005 |
|---|---|---|
| EP | 0 414 507 A1 | 2/1991 |

(Continued)

OTHER PUBLICATIONS

European Search Report issued in Application No. EP 08 25 0277 dated Jun. 14, 2012.

*Primary Examiner* — Tran Nguyen
*Assistant Examiner* — Naishadh Desai
(74) *Attorney, Agent, or Firm* — Oliff & Berridge, PLC (57) ABSTRACT

A component of an electric machine 46, the component comprising a core 10; two or more teeth 14 extending radially therefrom; at least one electromagnetic winding 12, each winding 12 around at least one of the teeth 14; wherein the core 10 having a cooling arrangement including at least one cooling insert 48 located between adjacent windings 12 and whereby in use a cooling fluid being arranged to flow through the at least one cooling insert 48 to facilitate heat transfer and dissipation from the electromagnetic windings 12. The cooling inserts providing improved cooling, structural support to the windings, and electrical insulation between the windings and the core.

43 Claims, 6 Drawing Sheets

U.S. PATENT DOCUMENTS

| | | |
|---|---|---|
| 6,933,648 B2 * | 8/2005 | Buchan et al. ............... 310/214 |
| 7,096,566 B2 * | 8/2006 | Du et al. ...................... 29/596 |
| 2003/0193256 A1 * | 10/2003 | Liebermann ................. 310/194 |
| 2004/0079898 A1 | 4/2004 | Buis et al. |
| 2004/0212259 A1 * | 10/2004 | Gould ......................... 310/67 R |
| 2004/0245883 A1 * | 12/2004 | Mitcham et al. ............. 310/216 |
| 2005/0189826 A1 * | 9/2005 | Tilton et al. .................. 310/54 |
| 2007/0222323 A1 * | 9/2007 | Neet ............................. 310/215 |

FOREIGN PATENT DOCUMENTS

| | | |
|---|---|---|
| EP | 1 630 930 A3 | 3/2006 |
| GB | 1062669 | 3/1967 |
| GB | 1217855 | 12/1970 |
| GB | 2374731 A | 10/2002 |
| JP | A-2004-297924 | 10/2004 |
| WO | WO 01/33698 A1 | 5/2001 |

* cited by examiner

COOLING ARRANGEMENT OF AN ELECTRICAL MACHINE

The present invention relates to improved cooling of an electric machine and is particularly concerned with cooling the electromagnetic windings of an electric machine.

In US 2004/0245883 A1 one conventional method of cooling the windings of an electric machine is to introduce laminations with high thermal conductivity into the stator core between iron laminations exhibiting low eddy current and hysteresis losses. The high thermally conductive laminations conduct heat away from the windings to the radially outer surface of the stator core where it can be conducted away by various means, for example contact with a heat sink. There must be electrical insulation between low loss iron and thermally conductive laminations. This may take the form of electrically insulating laminations therebetween, or the thermally conductive laminations may be formed of a material that is electrically insulating.

Although the thermally conductive laminations may be highly thermally conductive, one disadvantage of this method is that it does not transfer the heat efficiently from the windings because these laminations may be a minority of the core laminations resulting in a comparatively poor thermal conductivity, nearer that of the low loss iron laminations, compared to the conductivity of the introduced thermally conductive laminations.

Figure 1:
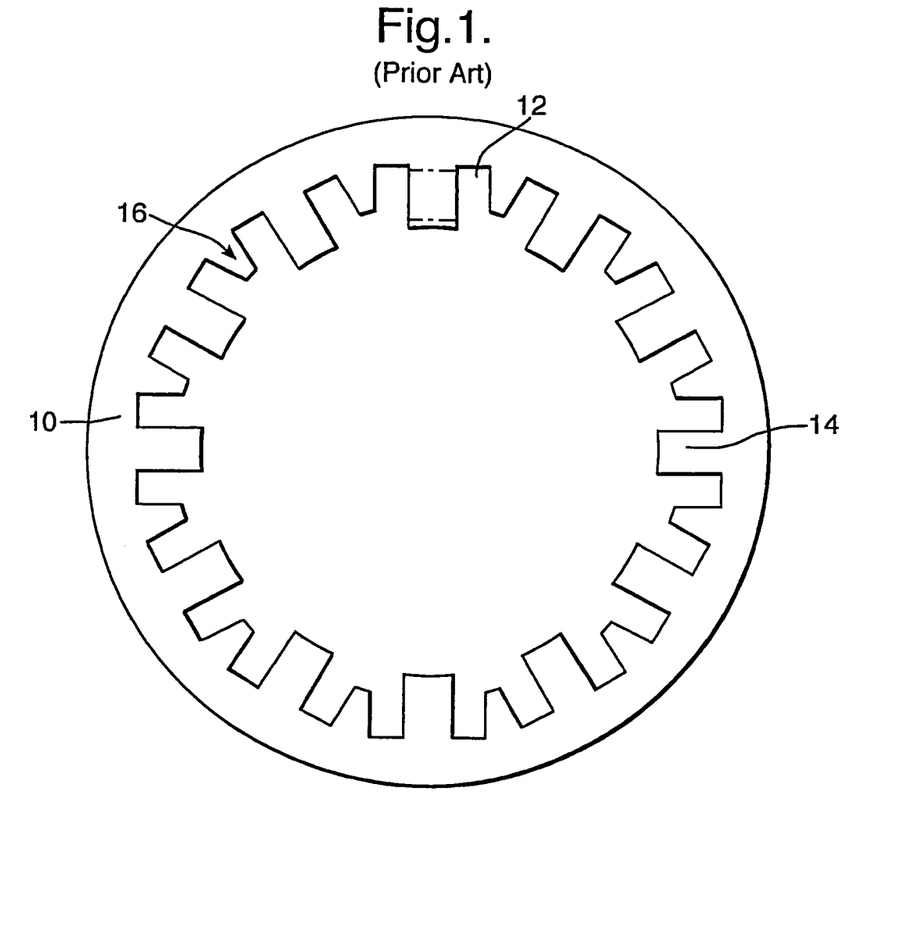
FIG. 1 is a cross section view of the stator arrangement of an electric machine according to the prior art.

A further conventional method of cooling the windings of an electric machine, as described in EP 0,414,507 A1, is to provide radial projections 16 from the stator core laminations into the gaps between adjacent windings 12 as shown in FIG. 1. These radial projections 16 provide some structural support to the windings 12 and increase the contact area between the windings 12 and the stator core 10. However, one disadvantage is that the stator core 10 is magnetic and this gives rise to flux leakage paths where some of the flux produced by the windings 12 takes a path from the stator teeth 14 to the projections 16 instead of traversing the air gap and taking a path through the rotor as intended. This flux leakage may also result in additional electromagnetic losses in the projections 16 and increased magnetic fluctuations around the windings 12 which reduce the efficiency of torque production. A second disadvantage is that the thermal conductivity of the projections 16 is limited to that of the stator core, around 30 $Wm^{-1}K^{-1}$.

Figure 2:
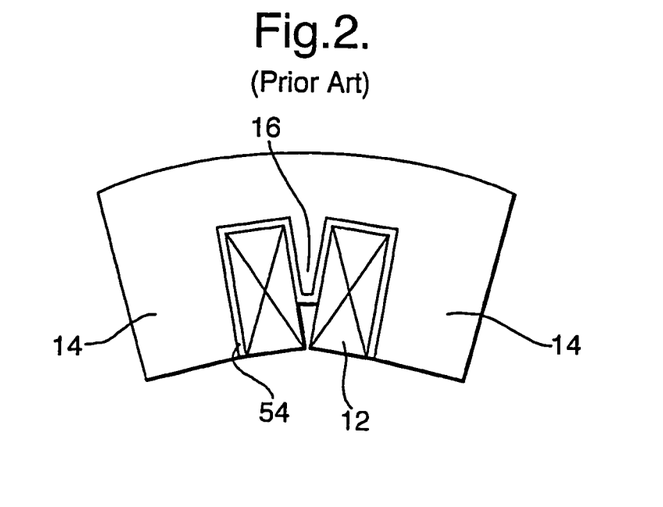
FIG. 2 is an enlargement of a triangular projection and slot liner according to the prior art.

A further disadvantage is that there is a requirement to provide electrical insulation between the windings 12 and the stator core 10 laminations and so an increased thermal resistance is introduced due to an electrically insulating slot liner 54 as shown in FIG. 2. A slot liner 54 of 0.2 to 0.5 mm thickness has a thermal conductivity of just 0.15 $Wm^{-1}K^{-1}$ which is poor even compared to the stator core 10. This conductivity may dominate the thermal performance of an electric machine, particularly at higher temperatures where winding losses are proportionally greater than at lower temperatures.

The present invention seeks to provide a novel cooling arrangement for the electromagnetic windings of an electric machine which reduces, or preferably overcomes, the above mentioned problems.

Accordingly the present invention provides a component of an electric machine, the component comprising a core; two or more teeth extending radially therefrom; at least one electromagnetic winding, each winding around at least one of the teeth; wherein the core having a cooling arrangement including at least one cooling insert located between adjacent windings and whereby in use a cooling fluid being arranged to flow through the at least one cooling inserts to facilitate heat transfer and dissipation from the electromagnetic windings.

Preferably there is an annular array of teeth.

Preferably there is at least one annular array of cooling inserts.

Preferably the cooling insert comprises a high thermal conductivity, low electrical conductivity material.

Preferably the cooling insert comprises a ceramic.

Preferably the cooling insert is cast. Preferably the cooling insert comprises aluminium nitride. Alternatively the cooling insert comprises silicon carbide.

Preferably the cooling insert is generally triangular, wedge shaped or tapering in cross section.

The cooling insert may be bonded to the core. Alternatively the cooling insert may be bonded to the windings.

Preferably the cooling insert is hollow and defines at least one cooling duct therethrough for a flow of cooling fluid.

Alternatively the cooling insert may be porous to allow a flow of cooling fluid therethrough.

Preferably the cooling inserts are located between circumferentially adjacent windings. Alternatively the cooling inserts are located between radially adjacent windings.

Preferably two or more cooling inserts are in fluid communication with a cooling fluid inlet manifold to provide a constant flow of cooling fluid to the cooling inserts.

Preferably two or more cooling inserts are in fluid communication with a cooling fluid outlet manifold to facilitate heat dissipation from the cooling inserts.

Preferably a metering arrangement is provided upstream of the cooling insert to optimise the flow rate of cooling fluid for a given running condition.

Preferably a means to supply cooling fluid to the cooling inserts comprises an air source.

The air source may be a bypass duct or a compressor of a gas turbine engine.

Preferably the component is a stator component of an electric machine. Alternatively the component is a rotor component of an electric machine.

The present invention will be more fully described by way of example with reference to the accompanying drawings, in which.

Figure 3:
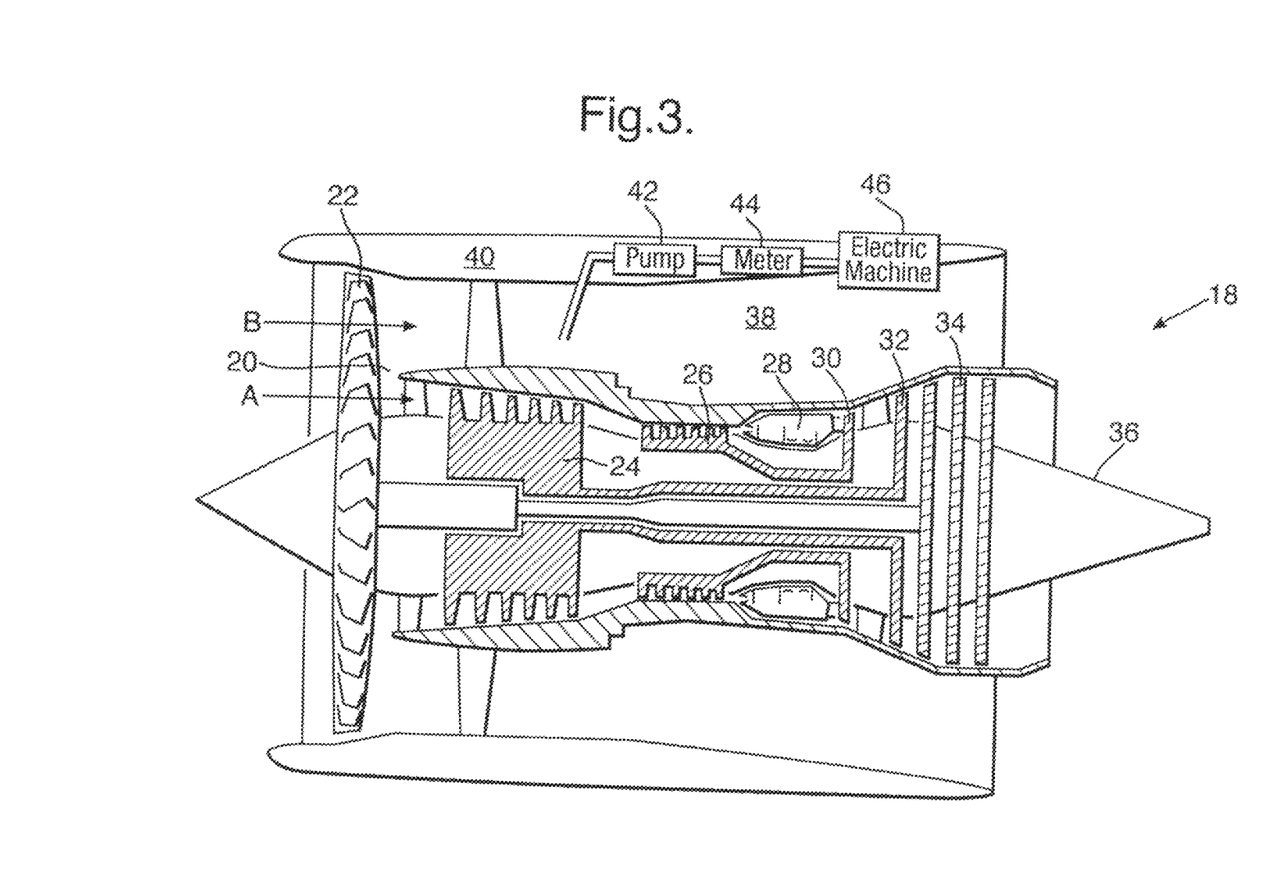
FIG. 3 is a sectional side view of an upper half of a gas turbine engine.

A gas turbine engine 18 is shown in FIG. 3 and comprises an air intake 20 and a propulsive fan 22 that generates two airflows A and B. The gas turbine engine 18 comprises, in axial flow A, an intermediate pressure compressor 24, a high pressure compressor 26, a combustor 28, a high pressure turbine 30, an intermediate pressure turbine 32, a low pressure turbine 34 and an exhaust nozzle 36. A nacelle 40 surrounds the gas turbine engine 18 and defines, in axial flow B, a bypass duct 38. Air is extracted from the bypass duct 38 by a pump 42 and a metering arrangement 44. The metering arrangement 44 feeds the air to an electric machine 46 according to the present invention.

Figure 4:
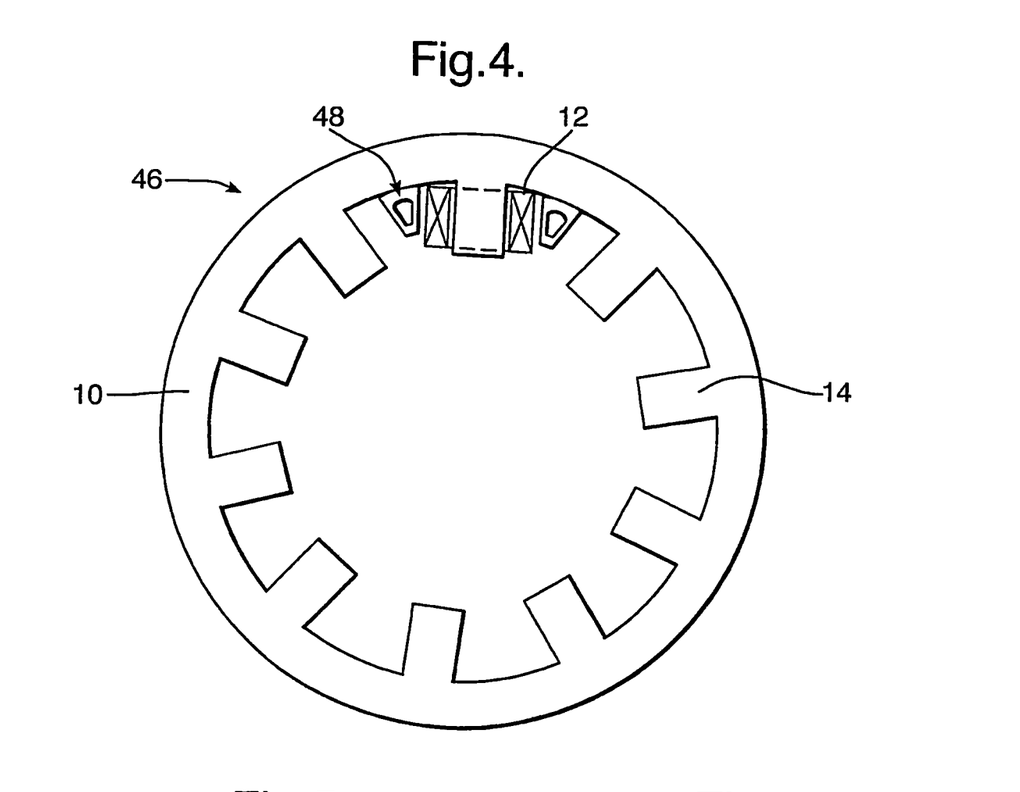
FIG. 4 is a cross section view of the stator arrangement of an electric machine according to the present invention.

An exemplary embodiment of the present invention is shown in FIG. 4 in which a stator arrangement of an electric machine 46 comprises a stator core 10 with a plurality of circumferentially spaced stator teeth 14 extending generally radially inwardly from the stator core 10 to form an annular array of stator teeth 14. Electromagnetic windings 12 are provided around each of the stator teeth 14 leaving substantially trapezoid spaces between adjacent windings 12. Ceramic inserts 48 cast from, for example, aluminium nitride are located in the spaces between adjacent windings 12. The ceramic inserts 48 extend radially from the stator core 10 and are circumferentially spaced to form an annular array of ceramic inserts 48. The ceramic inserts 48 are arranged to allow a flow of air along an axis into the page to remove heat from the windings 12. The ceramic inserts 48 also provide mechanical strength to the windings 12 and may assist in holding the windings 12 in position. Since ceramic inserts 48 are electrically insulating, the need for a separate insulating layer between the windings 12 and inserts 48 (for example the slot liner 54 seen in FIG. 2) is obviated. This means that the thermal resistance in this region of the stator core 10 is reduced. The amount the thermal resistance is reduced by is dependent on a number of factors including the materials used, the geometry of the winding and ceramic insert, the type of process used to encapsulate the winding and when that process is applied during the construction process. However, it is typically reduced by around 40%. Aluminium nitride is highly thermally conductive (approximately 180 $Wm^{-1}K^{-1}$ which is six times greater than the thermal conductivity of the stator core 44) and therefore provides efficient heat transfer from the electromagnetic windings 48 to the air flowing in the ceramic inserts 48.

Figure 5:
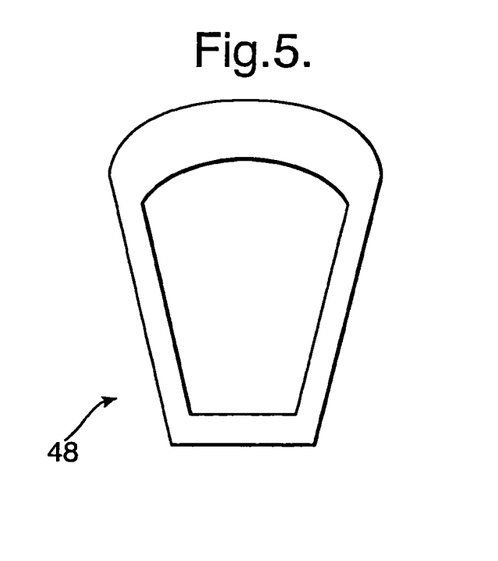
FIG. 5 is an enlargement of a ceramic insert defining a cooling fluid flow duct.

The ceramic inserts 48 may have one of a number of configurations which will be apparent to the reader skilled in the art. An enlargement of a first embodiment of the ceramic inserts 48 is seen at FIG. 5 where a ceramic insert 48 is hollow and has a single duct defined from low density cast ceramic for a flow of air therethrough. This provides a relatively large cross-sectional area duct for the air to flow along, allowing a large volume of air to be passed therethrough over a time period providing efficient cooling.

Figure 6:
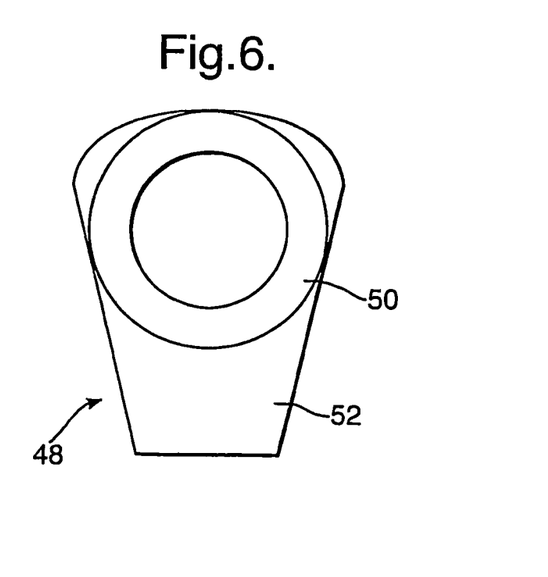
FIG. 6 is an enlargement of a second embodiment of a ceramic insert defining a cooling fluid flow duct.

An enlargement of a second embodiment of the ceramic inserts 48 is seen at FIG. 6. A high density hollow ceramic tube 50 with a single duct is cast into low density ceramic 52 to form a single high strength ceramic insert 48 of the correct shape to fit between adjacent windings 12 to maximise heat transfer therefrom. This thereby provides high strength to the adjacent windings 12 (not shown on this figure). This also provides for a large volume of air to flow.

Figure 7:
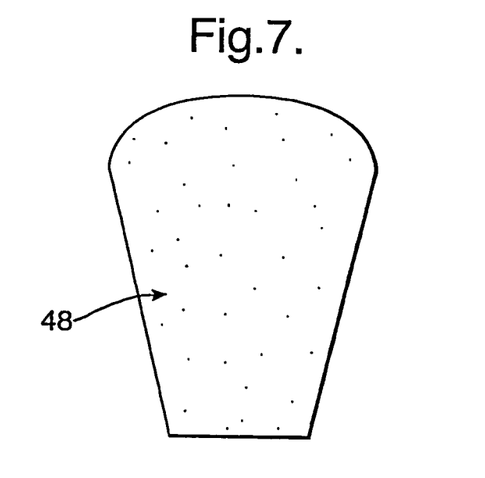
FIG. 7 is an enlargement of a third embodiment of a porous ceramic insert.

An enlargement of a third embodiment of the ceramic inserts 48 is seen at FIG. 7 in which the ceramic insert 48 is formed of porous ceramic, the porosity being such as to allow a flow of air therethrough.

Figure 8:
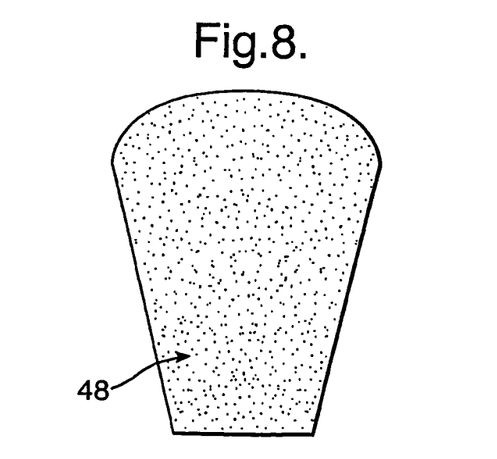
FIG. 8 is an enlargement of a fourth embodiment of a ceramic insert defining multiple cooling fluid flow ducts.

A fourth embodiment of the ceramic inserts 48 is seen in FIG. 8 in which each ceramic insert 48 is provided with a plurality of cooling ducts. These may be formed by either of the methods in the first and second embodiments or by any other appropriate method.

Figure 9:
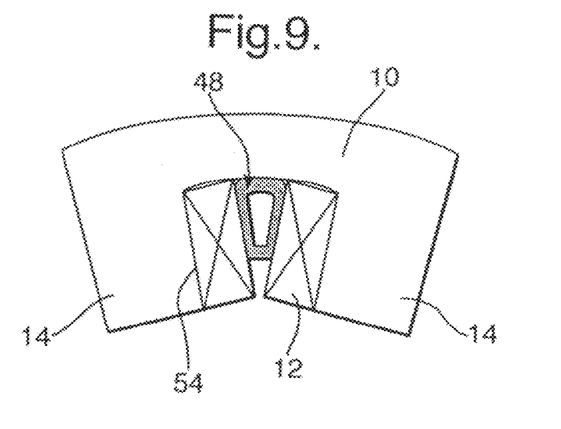
FIG. 9 is an enlargement of a ceramic insert in position according to the present invention.

FIG. 9 is an enlargement of adjacent windings 12 in a stator arrangement according to the present invention showing a section of the stator core 10 and a pair of adjacent electromagnetic windings 12 between adjacent teeth 14. FIG. 9 shows a ceramic insert 48 between adjacent windings 12 of the present invention. There is an equivalent electrically insulating slot liner 54 shown surrounding the windings 12 where they are adjacent to the stator tooth 14 and the stator core 10. The slot liner 54 is omitted adjacent to the ceramic insert 48 since the ceramic insert 48 provides the electrical insulation required without the detrimental thermal resistance associated with the slot liner 54.

Figure 10:
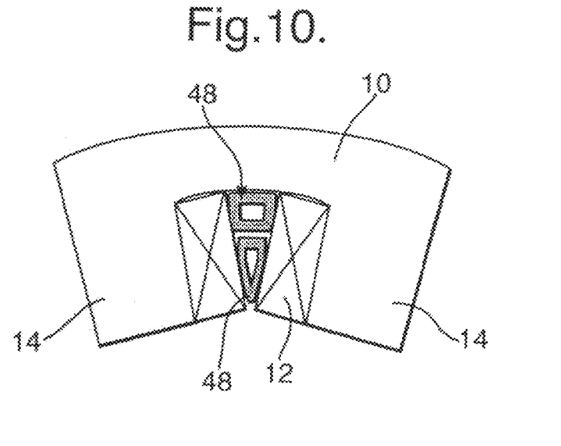
FIG. 10 is an enlargement of a ceramic insert in position according to an alternative embodiment of the present invention.

FIG. 10 is an enlargement of adjacent windings 12 in a stator arrangement according to the present invention showing a section of the stator core 10 and a pair of circumferentially spaced apart adjacent electromagnetic windings 12 between adjacent teeth 14. It shows a pair of ceramic inserts 48 located between the windings 12. These inserts 48 form a part of two concentric annular arrays of inserts 48 and are an example of an alternative embodiment of the present invention.

Figure 11:
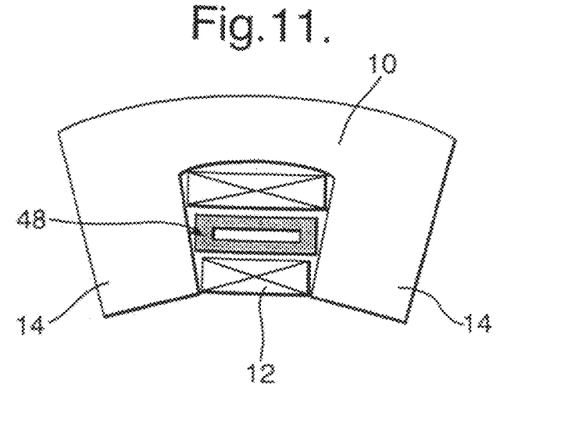
FIG. 11 is an enlargement of a ceramic insert in position according to a further embodiment of the present invention.

FIG. 11 shows an enlargement of adjacent windings 12 in a stator arrangement of a further embodiment of the present invention in which there are two adjacent teeth 14 protruding from a section of the stator core 10. In the slot between these teeth 14 are electromagnetic windings 12 that are radially spaced apart. Between the windings 12 is a ceramic insert 48 forming part of the annular array of inserts 48. The ceramic insert 48 may be any of the embodiments previously discussed and may be shaped to fit tightly into the space between adjacent windings 12. In this arrangement it may be necessary to provide a wedge (not shown) radially inwardly of the innermost winding to contain it within the slot between adjacent teeth 14. This may also be used in other arrangements if the present invention.

Figure 12:
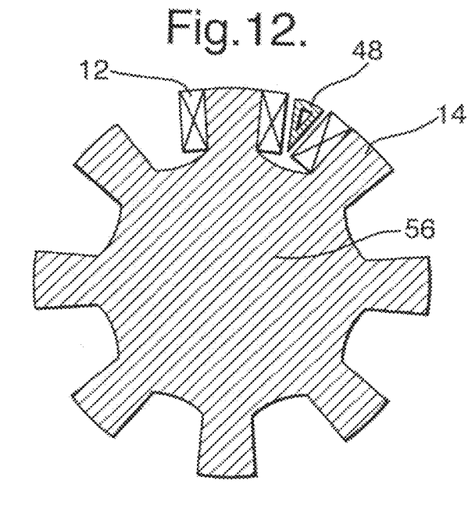
FIG. 12 is a cross section view of the rotor arrangement of an electric machine according to the present invention.

FIG. 12 shows a rotor arrangement of an electric machine according to the present invention. The rotor 60 comprises an annular array of protruding teeth 14. Between adjacent teeth 14 are electromagnetic windings 12, which may be wound around a single tooth 14 or a plurality of teeth 14 as previously. A cooling insert 48 is located between adjacent windings 12. Although the rotor 60 has been shown with the cooling insert 48 having a single duct and located between circumferentially adjacent windings it is equally possible to locate the insert 48 between radially adjacent windings 12 or to have more than one cooling insert 48 in the space between windings 12. The cooling insert 48 may take any of the forms discussed above, such as multi-ducted or porous.

Cooling fluid may be provided from any suitable source as appropriate for the application. In a preferred embodiment the electric machine 46 may be an electric motor, an electric starter or an electric generator embedded on one or more spools of a gas turbine engine to replace oil-cooled, gear-driven, externally mounted generators currently used. In this case the cooling fluid may be air from the bypass duct 38. However, in other cases the fluid may be compressed air from a compressor, oil, water or any other cooling fluid that is available and compatible with the materials envisaged.

Figure 13:
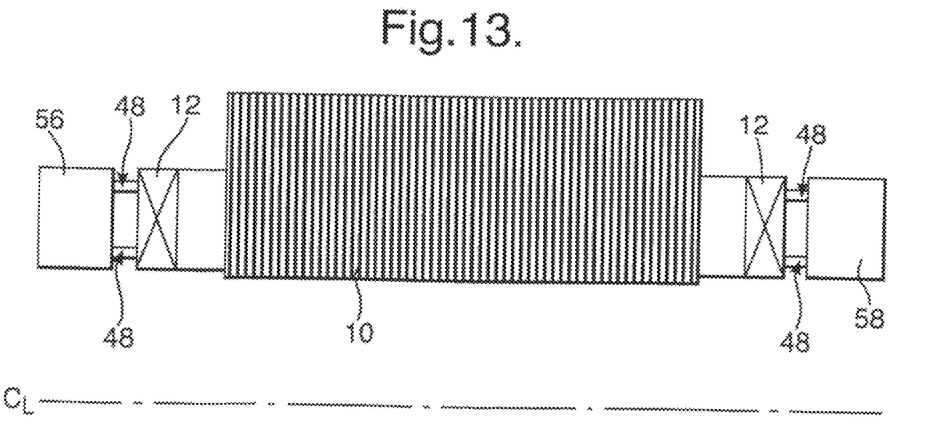
FIG. 13 is a longitudinal view of the stator arrangement of an electric machine showing inlet and outlet manifolds.

The ceramic inserts 48 may be in fluid communication with an inlet manifold 56 as shown in FIG. 13 to ensure a constant, even and sufficient supply of cooling fluid. The inlet manifold 56 may take the form of a supply reservoir, at least one upstream duct to pass the cooling fluid along or any other appropriate means. The cooling fluid may be metered by any appropriate metering means 44 upstream of the inlet to the ceramic inserts 48 to regulate the flow of cooling fluid to that required for the speed of the electric machine and the applied load. Similarly, the ceramic inserts 48 may be in fluid communication with an outlet manifold 58 to facilitate heat transfer away from the electric machine components. This may take the form of a heat sink, at least one downstream duct to pass the cooling fluid along or any other appropriate means.

Although the cooling inserts have been described as comprising a ceramic, preferably aluminium nitride, other suitable materials exhibiting high thermal conductivity and low electrical conductivity, including other suitable ceramics such as silicon carbide, may be used. The ceramic inserts have been described as cast but may be manufactured by other methods. Suitable bonding agents may bond the ceramic inserts to the stator core, for example high temperature adhesive. Alternatively the ceramic inserts may be secured to the stator core by mechanical means, for example by providing dovetail slots in the stator core and dovetail shapes on the ceramic inserts or vice versa, or by wedging the ceramic inserts between adjacent windings.

Although the invention has been shown as a stator component of an electric machine it is equally applicable to a rotor component. It will be understood by one skilled in the art that bypass air from a gas turbine is used by way of example only. The invention may also be applied to electric machines wherever they occur.

We claim:

1. A component of an electric machine, the component comprising:
    a core;
    two or more teeth extending radially from the core;
    at least one electromagnetic winding, each winding being arranged around at least one of the teeth; wherein
    the core has a cooling arrangement comprising at least one cooling insert being bonded to the core and located between adjacent windings, the at least one cooling insert defining a cooling fluid flow duct, the at least one cooling insert including only a single material with high thermal conductivity and low electrical conductivity; and
    a cooling fluid is arranged to flow through the at least one cooling insert to facilitate heat transfer and dissipation from the electromagnetic windings.

2. A component as claimed in claim 1 wherein the at least one cooling insert is located between circumferentially adjacent windings.

3. A component as claimed in claim 1 wherein the at least one cooling insert is located between radially adjacent windings.

4. A component of an electric machine, the component comprising:
    a core;
    two or more teeth extending radially from the core;
    at least one electromagnetic winding, each winding being arranged around at least one of the teeth; wherein
    the core has a cooling arrangement comprising at least one cooling insert located between circumferentially adjacent windings, the at least one cooling insert defining a cooling fluid flow duct, the at least one cooling insert including only a single material with high thermal conductivity and low electrical conductivity; and
    a cooling fluid is arranged to flow through the at least one cooling insert to facilitate heat transfer and dissipation from the electromagnetic windings.

5. A component as claimed in claim 4 wherein there is an annular array of teeth.

6. A component as claimed in claim 4 wherein there is at least one annular array of cooling inserts.

7. A component as claimed in claim 4 wherein the at least one cooling insert comprises a ceramic.

8. A component as claimed in claim 4 wherein the at least one cooling insert is a casting.

9. A component as claimed in claim 4 wherein the at least one cooling insert comprises aluminium nitride.

10. A component as claimed in claim 4 wherein the at least one cooling insert comprises silicon carbide.

11. A component as claimed in claim 4 wherein the at least one cooling insert is generally tapering in cross section.

12. A component as claimed in claim 4 wherein the at least one cooling insert is bonded to the windings.

13. A component as claimed in claim 4 wherein the at least one cooling insert is hollow and the cooling fluid flow duct is arranged for a flow of cooling fluid.

14. A component as claimed in claim 4 wherein the at least one cooling insert is porous to allow a flow of cooling fluid therethrough.

15. A component as claimed in claim 4 wherein each of the teeth has a winding around it.

16. A component as claimed in claim 4 wherein at least two cooling inserts are in fluid communication with a cooling fluid inlet manifold to provide a constant flow of cooling fluid to the at least two cooling inserts.

17. A component as claimed in claim 4 wherein at least two cooling inserts are in fluid communication with a cooling fluid outlet manifold to facilitate heat dissipation from the at least two cooling inserts.

18. A component as claimed in claim 4 wherein a metering arrangement is provided upstream of the at least one cooling insert to optimise the flow rate of cooling fluid for a given running condition.

19. A component as claimed in claim 4 further comprising an air source that supplies the cooling fluid.

20. A component as claimed in claim 19 wherein the air source is a bypass duct or a compressor of a gas turbine engine.

21. A component as claimed in claim 4 wherein the component is a stator component of an electric machine.

22. A component as claimed in claim 4 wherein the component is a rotor component of an electric machine.

23. An electric machine comprising the component as claimed in claim 4.

24. A component of an electric machine, the component comprising:
    a core;
    two or more teeth extending radially from the core;
    at least one electromagnetic winding, each winding being arranged around at least one of the teeth; wherein
    the core has a cooling arrangement comprising at least one cooling insert located between radially adjacent windings, the at least one cooling insert defining a cooling fluid flow duct, the at least one cooling insert including only a single material with high thermal conductivity and low electrical conductivity; and
    a cooling fluid is arranged to flow through the at least one cooling insert to facilitate heat transfer and dissipation from the electromagnetic windings.

25. A component as claimed in claim 24 wherein there is an annular array of teeth.

26. A component as claimed in claim 24 wherein there is at least one annular array of cooling inserts.

27. A component as claimed in claim 24 wherein the at least one cooling insert comprises a ceramic.

28. A component as claimed in claim 24 wherein the at least one cooling insert is a casting.

29. A component as claimed in claim 24 wherein the at least one cooling insert comprises aluminium nitride.

30. A component as claimed in claim 24 wherein the at least one cooling insert comprises silicon carbide.

31. A component as claimed in claim 24 wherein the at least one cooling insert is generally tapering in cross section.

32. A component as claimed in claim 24 wherein the at least one cooling insert is bonded to the windings.

33. A component as claimed in claim 24 wherein the at least one cooling insert is hollow and the cooling fluid flow duct is arranged for a flow of cooling fluid.

34. A component as claimed in claim 24 wherein the at least one cooling insert is porous to allow a flow of cooling fluid therethrough.

35. A component as claimed in claim 24 wherein each of the teeth has a winding around it.

36. A component as claimed in claim 24 wherein at least two cooling inserts are in fluid communication with a cooling fluid inlet manifold to provide a constant flow of cooling fluid to the at least two cooling inserts.

37. A component as claimed in claim 24 wherein at least two cooling inserts are in fluid communication with a cooling fluid outlet manifold to facilitate heat dissipation from the at least two cooling inserts.

38. A component as claimed in claim 24 wherein a metering arrangement is provided upstream of the at least one cooling insert to optimise the flow rate of cooling fluid for a given running condition.

39. A component as claimed in claim 24 further comprising an air source that supplies the cooling fluid.

40. A component as claimed in claim 39 wherein the air source is a bypass duct or a compressor of a gas turbine engine.

41. A component as claimed in claim 24 wherein the component is a stator component of an electric machine.

42. A component as claimed in claim 24 wherein the component is a rotor component of an electric machine.

43. An electric machine comprising the component as claimed in claim 24.

\* \* \* \* \*